(12) United States Patent
Lewis

(10) Patent No.: US 6,502,604 B1
(45) Date of Patent: Jan. 7, 2003

(54) PROTECTING AND IDENTIFYING FITTINGS

(76) Inventor: Michael Joe Lewis, 2247 Belleview Dr., Oklahoma City, OK (US) 73112

( * ) Notice: Subject to any disclaimer, the term of this patent is extended or adjusted under 35 U.S.C. 154(b) by 0 days.

(21) Appl. No.: 10/184,497

(22) Filed: Jun. 28, 2002

(51) Int. Cl.[7] .................................................. F16L 55/10
(52) U.S. Cl. ..................... 138/96 R; 138/96 T; 138/89; 215/306; 215/319; 220/287
(58) Field of Search ............... 138/96 R, 96 T, 138/89; 215/230, 250, 251, 306, 358, 316, 317, 319, 359; 220/256.1, 257.1–259.2, 375, 287

(56) References Cited

U.S. PATENT DOCUMENTS

| | | | | |
|---|---|---|---|---|
| 2,118,073 | * | 5/1938 | Dittmeyer | 138/96 R |
| 2,379,529 | * | 7/1945 | Kennedy | 138/96 R |
| 2,701,584 | * | 2/1955 | Philips | 138/96 T |
| 2,977,993 | * | 4/1961 | Scherer | 138/96 T |
| 2,989,087 | * | 6/1961 | Higgins | 138/96 T |
| 3,065,767 | * | 11/1962 | Topf | 138/89 |
| 3,104,681 | * | 9/1963 | Gray, Jr. | 138/96 R |
| 4,869,293 | * | 9/1989 | Botsolas | 138/109 |
| 5,004,016 | * | 4/1991 | Kliewer | 138/96 R |
| 5,623,971 | * | 4/1997 | Foernzler | 116/209 |
| 5,667,094 | * | 9/1997 | Rapchak et al. | 215/306 |
| 5,881,774 | * | 3/1999 | Utterberg | 138/96 R |
| 5,971,028 | * | 10/1999 | Kurimoto et al. | 138/96 T |
| 5,983,947 | * | 11/1999 | Utterberg | 138/106 |
| 6,056,015 | * | 5/2000 | Lewis | 138/89 |
| 6,176,267 | * | 1/2001 | Dugan et al. | 138/89 |
| 6,332,478 | * | 12/2001 | Holden et al. | 138/109 |

* cited by examiner

Primary Examiner—Patrick Brinson
(74) Attorney, Agent, or Firm—Harold Levine, Esq., PC (57) ABSTRACT

Compensating and identifying caps and cap assemblies for temporarily capping fittings. Each cap comprises a generally or pseudo cylindrically shaped member that includes a plurality of substantially planar panel segments contiguously connected to form a symmetrical polygonal cup-shape (e.g., a hexagon). One end is closed to complete the formation of the cup. Each cup has an outwardly flaring lip to facilitate mounting on a fitting, and the substantially planar panel segments slope inwardly slightly to facilitate molding and mounting. At the intersection of at least two of the panel segments, there are included resiliently expandable relief recesses so that if the member is force-fit mounted on a fitting slightly larger than its un-expanded dimensions, the material of the relief recesses expands correspondingly to permit such mounting. Pairs of such caps are connected by an easily frangible connecting strip to form assemblies which facilitate concurrent mounting on disengaged ends of tubing connectors. Color coding is provided, and other frangible strips are molded as integral parts of the caps to further facilitate use, separation of parts of the cups for partial removal, and for leaving small rings of color or other coded material for subsequent identification.

37 Claims, 6 Drawing Sheets

PROTECTING AND IDENTIFYING FITTINGS

This invention relates to devices and methods for identifying and protecting fittings and more particularly to simplifying the temporary plugging/protection and/or identification of fittings adapted for interconnection of tubular members.

Temporary protection and identification for ends of tubes and the like has heretofore been proposed, illustrative of which is the disclosure of U.S. Pat. No. 6,056,015 granted May 2, 2000 to the inventor hereof Other proposals have been made for protecting disconnected fittings or ends of tubular material, illustrative of which are U.S. Pat. No. 600,892 to Schirra; U.S. Pat. No. 2,580,762 granted to J. R. Grenier et al.; U.S. Pat. No. 3,065,767 granted to Topf; U.S. Pat. No. 3,104,681 granted to Gray, Jr.; U.S. Pat. No. 3,574,312 granted to Joseph T. Miller; U.S. Pat. No. 3,840,052 granted to Schmidt; U.S. Pat. No. 3,847,183 granted to Meyer; U.S. Pat. No. 4,079,756 granted to Smiley; U.S. Pat. No. 4,139,023 granted to Turley; U.S. Pat. No. 4,239,062 granted to Callicoatte; and U.S. Pat. No. 4,506,797 granted to Bullock. Also a proposal of interest is set forth in an undated technical report of the General Electric Company titled "G-E Sealing Caps and Sleeves For Pipe and Thread Protection" and received by the USPTO in June, 1947.

Although such proposals have individually addressed selected problems encountered in effectively providing for thread protection and identification, there yet have remained opportunities for further improvement. Accordingly, there has continued to be a need for improved devices and methods for identifying and protecting fittings which provide for dependability and low cost while maintaining ease and simplicity in use; and which include, in combination, pluralities of features.

BRIEF SUMMARY OF THE INVENTION

The improved system according to the invention hereof includes simple and cost effective features that facilitate ready marking of fittings according to size, type and match, while providing protection for threads and other connector elements. Thus, in accordance with the preferred embodiment hereof, flexibility and dependability of marking and protection are provided through use of improved capping members which include, in combination, slightly tapered cavities, tapered lips and resiliently expandable relief recesses to facilitate use with slightly varying sizes of fittings when press fit onto threads and other connector elements. Other features include matched pairing of capping members, color coding of individual and paired capping assemblies, provision of frangible strips connecting members into pairs, provision of other frangible strips extending circumferentially about the capping members to facilitate optional removal of parts of the capping members while retaining color coded markings, and scored lines on lips of the capping members to facilitate removal when desired. The preferred embodiments include both the capping members and methods of deployment and use. Thus according to the invention, there is provided a compensating and identifying capping member for protecting fittings including a combination of features. Comprising a shaped member having a plurality of side segments connected to form a symmetrical enclosure, said member having expandable relief recesses of resilient material contiguously homogeneous with and partly interconnecting at least a pair of said side segments. Also according to the invention, the capping member optionally includes a first circumferential crease and a second circumferential crease substantially parallel to the first circumferential crease and displaced from the first circumferential crease by a predetermined distance so as to create a frangible strip adapted for manual disengagement from the member.

There also is disclosed a compensating and identifying assembly including a first compensating and identifying member for protecting fittings comprising a first generally cylindrically shaped member having a first plurality of substantially planar side panel segments contiguously connected to form a polygon, the first member having expandable relief recesses of resilient material contiguously homogeneous with and interconnecting at least a pair of said first plurality of substantially planar side panel segments; a second compensating and identifying member for protecting fittings comprising an essentially cylindrically shaped member smaller than the first member, the second member having a plurality of substantially arcuate side panel segments contiguously connected to form said essentially cylindrically shaped member, the second member having expandable relief recesses of resilient material contiguously homogeneous with and interconnecting at least a pair of the arcuate side panel segments; and a connecting frangible strip connecting the first member with the second member and contiguous with the first member and the second member.

The invention also includes methods of deployment and use of the foregoing members. Thus, it includes a method of identifying and protecting one of a pair of mating fittings comprising identifying the size of said one of the pair of fittings, selecting the correct size for a member constructed in accordance with the foregoing description, disposing the selected member of the correct size adjacent said one of said fittings, expanding recessed reliefs of the selected member by press fitting the selected member onto said one of said fittings. It also includes a method of identifying and protecting a mated pair of fittings using a compensating and identifying assembly constructed in accordance with the foregoing description, including identifying the size of a first one of a pair of fittings, selecting correct size for a first shaped member constructed according to the foregoing description, disposing the first shaped member adjacent the first one of the fittings, expanding recessed reliefs of the first shaped member by press fitting the first shaped member onto said one of the fittings, identifying the size of the other one of the pair of fittings, selecting the correct size for a second shaped member constructed according to the foregoing description, disposing the second shaped member adjacent the other one of said pair of fittings, and expanding recessed reliefs of the second shaped member by press fitting the second shaped member onto the other one of said pair of fittings.

OBJECTS AND FEATURES OF THE INVENTION

It is one general object of the invention to improve compensating and identifying members.

It is another object of the invention to facilitate protection and marking of fittings.

It is yet another object of the invention to reduce cost and complexity of protective caps for fittings.

It is yet another object of the invention to enhance versatility of use of protective caps for fittings.

Accordingly, in accordance with one feature of the invention, a cap of a generally cylindrical shape is proposed, and at least a pair of relief recesses are provided therein, thus facilitating versatility of use in press fitting onto fittings of moderately varying dimensions.

In accordance with an additional feature of the invention, a flared lip is provided around an opening of the generally cylindrical cap, thus further facilitating press fitting on to fittings.

In accordance with another feature of the invention, a lip location weakened by a score line is provided to facilitate breaking and removing a part of the cap from a fitting when desired.

In accordance with still another feature of the invention, the internal geometry of the cap decreases slightly from the flared lip to the closed end, thereby facilitating molding and subsequent use in pressing onto fittings.

In accordance with another feature of the invention, provision is made for optional identification by providing color coding of the caps.

In accordance with yet another feature of the invention, the caps include circumferential frangible strips provided for easy manual separation of parts of the caps, thus facilitating use.

In accordance with still another feature of the invention, provision is additionally made for disposing the caps in pairs by connecting them together with frangible strips that are homogeneous with the caps, thus facilitating molding of cap assemblies while providing for ready separation of the caps if desired.

These and other objects and features of the invention will be apparent from the following description, by way of example of a preferred embodiment, with reference to the drawing.

DESCRIPTION OF A PREFERRED EMBODIMENT

Before proceeding with a detailed description of the preferred embodiment, there are now set forth the following definitions as they are employed in the specification and claims hereof:

Generally Cylindrical Shape means: The shape of a geometrical configuration of panel segments joined to form a symmetrical enclosure.

Essentially Cylindrical Shape means: The shape of a geometrical configuration of arcuate panel segments joined to form a segmented cylinder.

Cup-shaped Member means: A cup-like member having a generally cylindrical shape and having two opposing ends with one of the ends being sealed while the other of the opposing ends is open.

Relief Recess means: A space bounded by a fold of material connecting principal parts of adjacent wall panel segments and of homogeneous character therewith, the depth of the interior projections of the folds lying in a range of from about one to twelve percent of the internal diameter of the cup-shaped member, or in the case of non circular configuration, the internal distance between opposing walls of the cup-shaped member.

Also, it should be noted that the arrows shown in the drawings indicate movement of parts in the direction of the arrows as generally described in examples for the earlier of the drawing figures.

Figure 1:
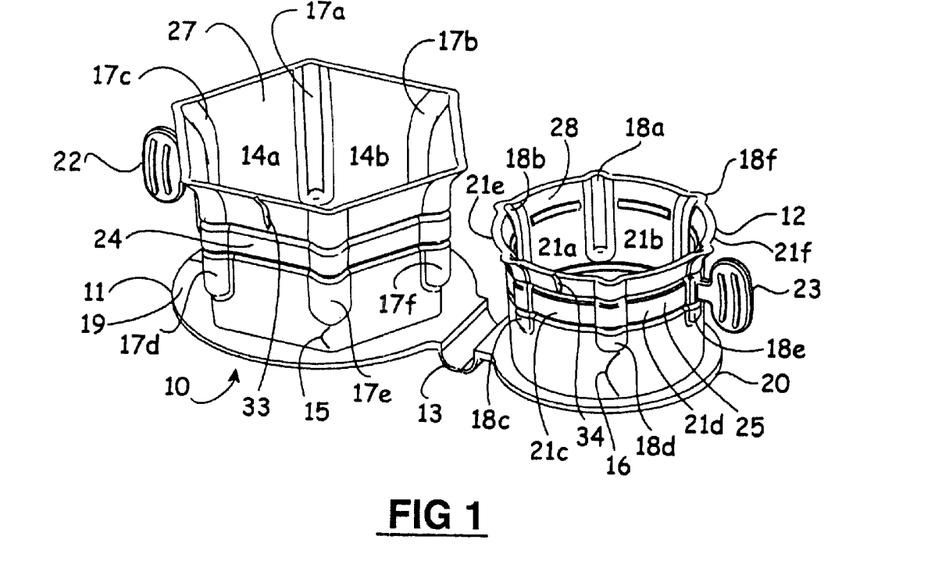
FIG. 1 is a perspective view depicting a pair of caps of different sizes connected by a frangible strip.

Now turning to the drawing, and more particularly FIG. 1 thereof, it will be seen to be a perspective view depicting an assembly 10 comprising a pair of caps 11, 12 of different sizes connected by a frangible strip 13. These two caps 11 and 12 are significantly different in that cap 11 is essentially a symmetrical generally cup-shaped enclosure (in the preferred embodiment, hexagonal in cross section) while cap 12 is a smaller essentially symmetrical generally cup-shaped enclosure (in the preferred embodiment, a segmented and tapered cylinder of essentially cylindrical shape). Other differences include the dimensions for the distances 15 and 16 between the bottoms of the resilient reliefs 17,18 and the bases or end closures 19, 20 of the two caps 11 and 12. In this connection, it should be noted that in the embodiment of FIG. 1, resilient reliefs 17 extend downwardly almost to the base, or end closure 19, thus leaving only a small distance 15 there between; whereas the resilient, reliefs 18 terminate much higher, at substantial distances 16 above base 20. This is to allow the larger hex size fittings (e.g., female connector fitting 40a (FIG. 12) to go nearly all the way down into the cap 11 and providing space for the end region 41a of male connector fitting 41 when cap 12 is put in place.

Further reference to cap 11 in FIG. 1 reveals the presence of essentially planar side wall panel segments, e.g., panels 14a and 14b which are connected by resilient relief 17a the remaining side wall panels of cap 11 being connected by similar resilient reliefs 17b–f. Also shown in FIG. 1 are tabs 22 and 23 which are provided to facilitate the breaking and removal of circumferential frangible strips 24 and 25 as hereinafter further described. Further reference to FIG. 1 also depicts upwardly and outwardly flaring lips 27 and 28 which facilitate press fitting of caps 11 and 12 onto mating fittings of tubular members (shown in subsequent figures). These lips 27 and 28 are each intentionally scored (as illustrated at 33 and 34) to facilitate subsequent breaking and removal as indicated below.

As mentioned above, cap 12 is essentially cylindrical so as to be adapted for mounting on circular cross-sectioned male fittings which typically are threaded. Thus, cap 12 includes an essentially cylindrical sidewall which is divided into a plurality of partial arcuate segments 21a, 21b, 21c, 21d, 21e and 21f by resilient reliefs 18a, 18b, 18c, 18d, 18e and 18f.

Figure 2:
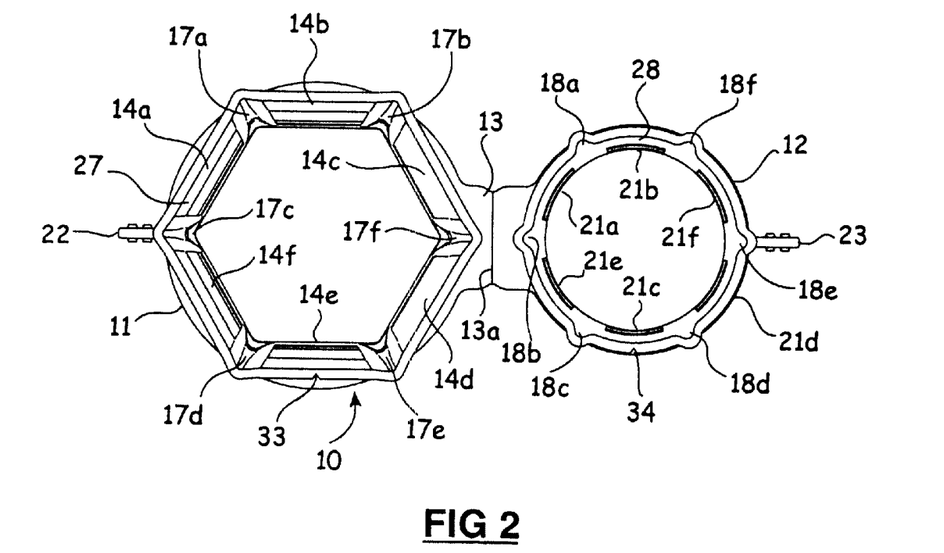
FIG. 2 is a top view of the cap assembly of FIG. 1.

As mentioned above, FIG. 2 is a top view of the cap assembly 10 of FIG. 1. There, it will be seen are the elements of FIG. 1 as seen from above, with the outwardly flaring lips 27 and 28, as well as the slightly downwardly and inwardly sloping surfaces of all of the essentially planar panel segments 14a, 14b, 14c, 14d, 14e and 14f as well as all of the arcuate panel segments 21a–21f. Also depicted is an intentionally thinned section 13a of frangible connecting strip 13 which is provided to facilitate separation of caps 11 and 12 when desired. While considering the sloping surfaces of the planar and arcuate panel segments, the preferred range of slope is within a range of from about one to fifteen degrees from the vertical.

Figure 3:
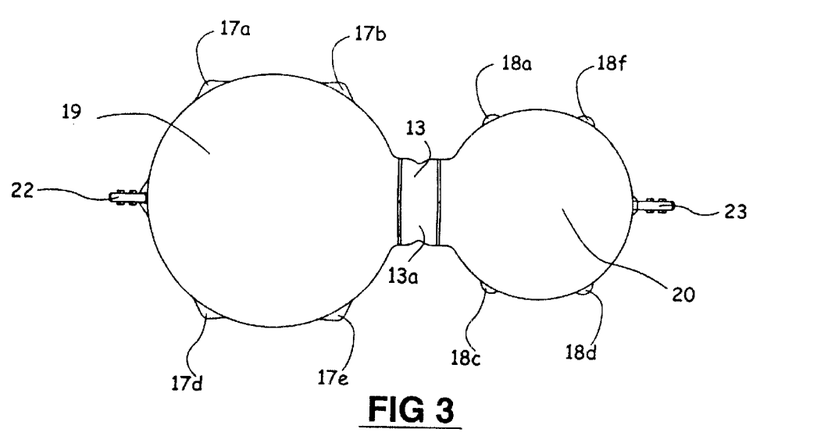
FIG. 3 is a bottom view of the cap assembly of FIG. 1.

As mentioned previously, FIG. 3 is a bottom view of the cap assembly of FIG. 1. There, in FIG. 3 are shown the bases, or end closures 19 and 20; the tabs 22 and 23; the frangible strip 13 and its thinned section 13a; and resilient relief 17a, 17b, 17d, 17e, 18a, 18c, 18d and 18f.

Figure 4:
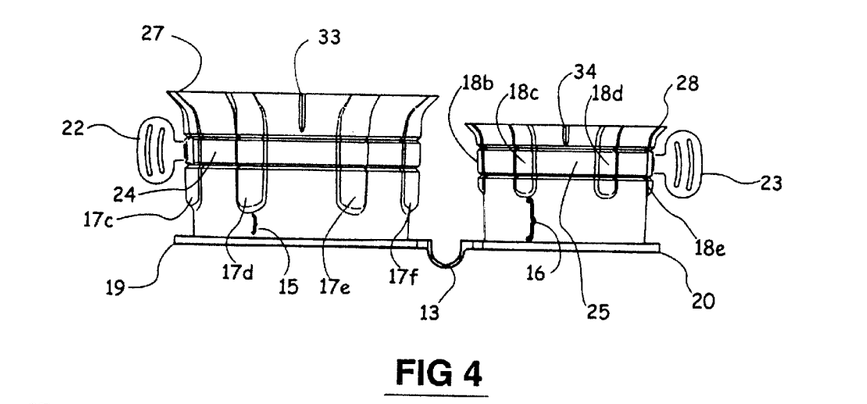
FIG. 4 is a front elevation view of the cap assembly of FIG. 1.

FIG. 4 is a front elevation view of the cap assembly of FIG. 1. There, it will be seen are tearing tabs 22 and 23; flaring lips 27 and 28; bases 19 and 20; frangible connecting strip 13; resilient reliefs 17c–17f; resilient reliefs 18b–18e; space 16; circumferential frangible strips 24 and 25; and scored lines 33 and 34.

Figure 5:
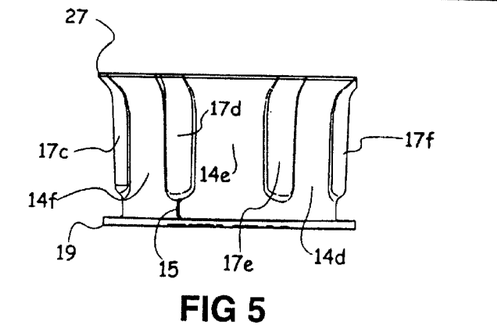
FIG. 5 is a front elevation view of a stand-alone cap similar to the larger of the caps in FIG. 4.
Figure 6:
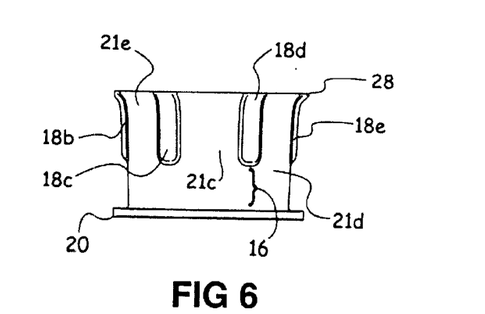
FIG. 6 is a front elevation view of a stand-alone cap similar to the smaller of the caps in FIG. 4.

As mentioned above, FIGS. 5 and 6 are front elevation views of stand-alone caps similar to the caps in FIG. 4 but simplified to recognize the fact that such caps may be formed and used individually as well as in pairs illustrated in FIGS. 1–4. FIGS. 5 and 6 additionally facilitate recognition of the above-described features including segmentation of the side panels (e.g., 14d–14f and 21c–21e) by the resilient reliefs (e.g., 17c–17f and 18b–18e), the differences in spaces (e.g., spaces 15, 16) between the lower extremities of the resilient reliefs and the base members, and flared lips 27, 28.

Figure 5A:
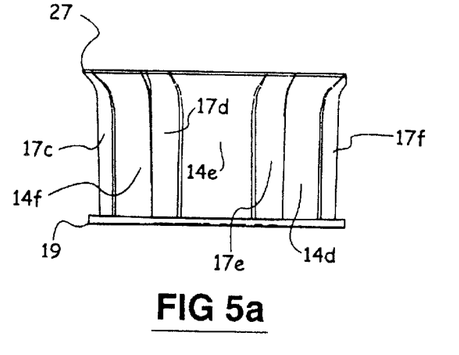
FIG. 5a is a front view of an embodiment similar to that of FIG. 5 except for the resilient reliefs (e.g., reliefs 17c, 17d, 17e and 7f) extending the entire distance from the lip 27 to the base 19.
Figure 6A:
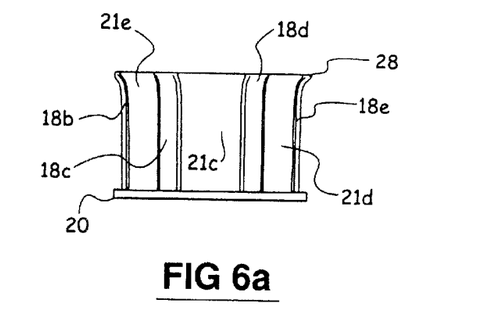
FIG. 6a is a front view of an embodiment similar to that of FIG. 6 except for the resilient reliefs (e.g., reliefs 18b, 18c, 18d and 18e) extending the entire distance from the lip 28 to the base 20.

As mentioned above, FIGS. 5a and 6a are front views of alternate embodiments which are similar to those of FIGS. 5 and 6 except for the resilient reliefs (e.g., reliefs 17c, 17d, 17e and 17f; and reliefs 18b, 18c, 18d and 18e) extending the entire distances from the lips 27, 28 to the bases 19, 20. Such geometry may be preferable in some applications, e.g., in which sealing is not a significant factor.

Figure 7:
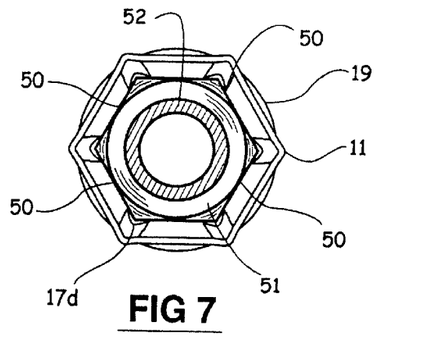
FIG. 7 is a top view of one of the caps showing the expandable reliefs slightly expanded as they would be when press fit onto a comfortably fitted fitting.

FIG. 7 is a top view of one of the caps showing the expandable reliefs essentially slightly expanded as they would be when press fit onto a comfortably fitted fitting (i.e., a fitting only slightly larger than the cap). There, it will be observed, are a female connector fitting having conventional hexagonal shoulders 50, circular collar section 51 and extending hose 52. Since the fitting is only slightly larger than the cap 11, the reliefs (e.g., 17d) are only slightly expanded (as shown) from their unmounted condition.

Figure 8:
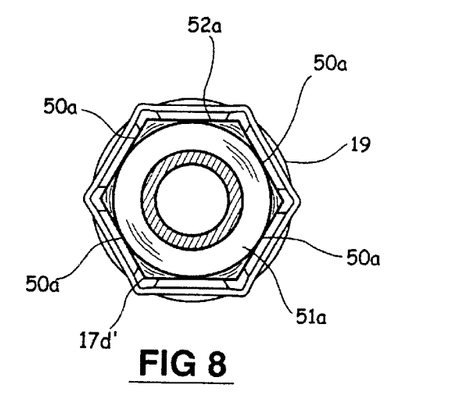
FIG. 8 is a top view of the member of FIG. 7 showing the expandable reliefs more expanded as when press fit onto a larger fitting.

FIG. 8 is a top view of the member of FIG. 7 showing the expandable reliefs more expanded as when press fit onto a larger fitting. There, it will be observed, are a larger female connector having conventional hexagonal shoulders 50a, circular collar section 51a and extending hose 52a. Since the fitting is substantially larger than the cap 11, the reliefs (e.g., 17d') are almost completely expanded (as shown) from their unmounted condition; and, as shown, even the deepest parts of their reliefs are essentially in contact with the hexagonal shoulders.

As is well known to those skilled in the art, conducting maintenance, repairs, replacement or even initial construction or testing, often involves connection/disconnection of tubular members such as hoses. Connection, or re-connection, of the correct hose fittings is not only important to the subsequent proper operation of equipment but in some instances can be critical to avoid catastrophe. By utilizing the assemblies as illustrated in FIGS. 1–4, 9–11, and 13–22, proper connection/re-connection is greatly facilitated and the possibility of incorrect reconnection greatly reduced. Thus, when assemblies are coded (e.g., as by color coding), and when the assemblies are disposed as described below, not only are the unconnected fitting ends protected, but they are also marked so as to clearly identify them and their mating fittings for use in achieving accurate pairing and re-connection.

Figures 9, 10:
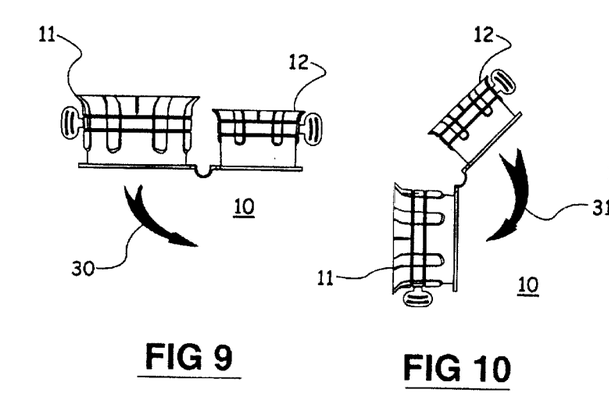
FIG. 9 is similar to FIG. 4 and depicting the cap assembly before the members are swung through an arc progressively to achieve the disposition depicted in FIG. 11.
FIG. 10 depicts the assembly of FIG. 9 as the caps are being swung through an arc partly to achieve the disposition depicted in FIG. 11
Figure 11:
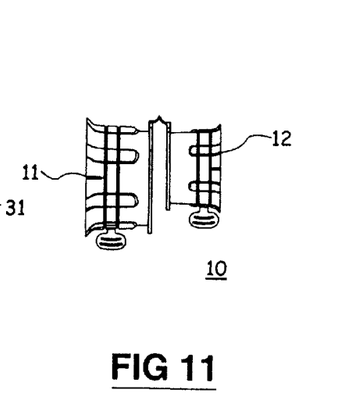
FIG. 11 depicts the assembly of FIG. 9 when; the caps have been swung through an arc to completely achieve the disposition depicted in FIG. 11.

Turning now to FIGS. 9–11, it will be seen that FIG. 9 is similar to FIG. 4 and depicts the cap assembly 10 before the members 11 and 12 are swung through an arc (partly represented by arrow 30) to achieve the disposition depicted in FIG. 11.

FIG. 10 depicts the assembly of FIG. 9 after the caps have been partly swung through an arc (represented by arrow 31) on the way to achieving the disposition depicted in FIG. 11. There, in FIG. 10, it will be seen that larger cap 11 has been rotated about 90 degrees with respect to its position in FIG.

9 so as to dispose it axially in alignment with tubular fittings such as those depicted in FIGS. 13–22. Although FIG. 10 depicts member 11 as having been first rotated, it will be evident that disposing members 11 and 12 to the positions shown in FIG. 11 could involve first rotating member 12 and then rotating member 11, or that it could involve simultaneous rotation of both members 11 and 12 with respect to each other. In any event, the frangible connecting strip is bent and elements 11 and 12 are preferably disposed in the condition depicted in FIG. 11 in order to facilitate mounting on mating fittings as is illustrated in FIGS. 13–22. However, it will also be evident that it is not necessary to the successful mounting of the caps that they be positioned as shown in FIG. 11, for they may individually be fitted on the intended fittings without being positioned in axial alignment as is the situation with FIG. 11. In the preferred method herein, caps 11 and 12 are disposed as illustrated in FIG. 11 before being temporarily mounted on their intended host fittings.

Figure 12:
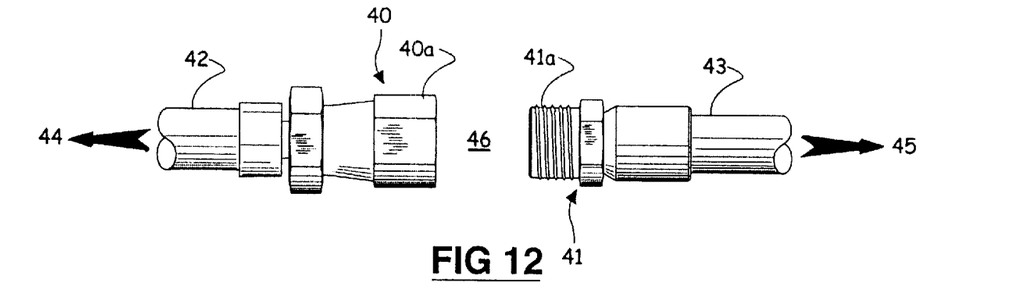
FIG. 12 is an exploded view depicting male and female fittings typically employed for joining tubing in their disconnected state.
Figure 13:
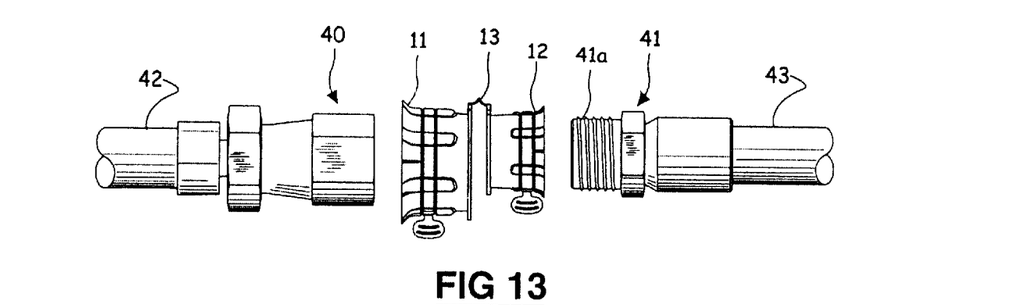
FIG. 13 is an exploded view similar to FIG. 12 but including a composite cap assembly according to FIG. 11.

FIG. 12 is an exploded view depicting male and female fittings typically employed for joining tubing in their disconnected state. There, it will be seen is an exploded view depicting, in their disconnected state, a male fitting 41 and a corresponding female fitting 40 such as are typically employed for joining tubing or hoses. Although for illustrative purposes, hoses 42 and 43 are shown, it should be understood that the principles hereof may be applicable to other tubular members as well. Arrows 44 and 45 are included to represent movement apart of connector fittings 40 and 41 to provide a space 46 there between so as to permit subsequent emplacement of an assembly comprising a pair of caps, (e.g., composite capping assembly 10) as shown in FIG. 13.

As mentioned above, FIG. 13 is an exploded view similar to FIG. 12 but including the composite cap assembly 10 according to FIG. 11. Assembly 10 is preferably emplaced between and in axial alignment with female connector fitting 40 and male connector fitting 41 (as shown).

Figure 14:
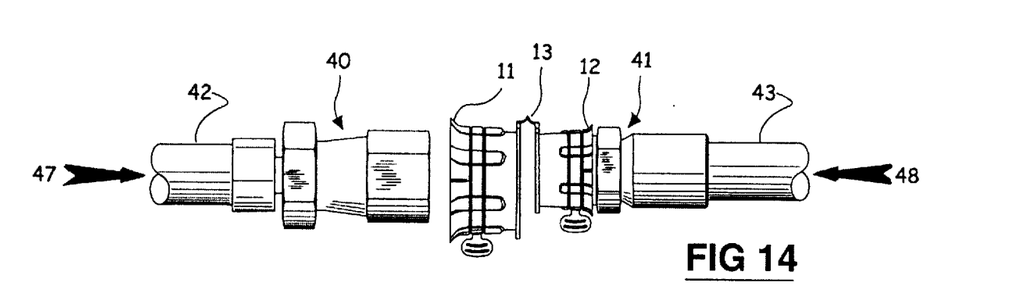
FIG. 14 is a view similar to FIG. 13 but showing one of the caps after press fitting onto the male fitting of FIG. 13.
Figure 15:
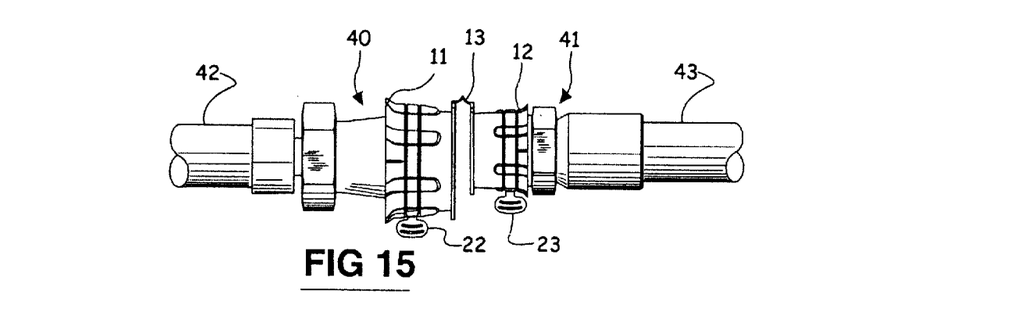
FIG. 15 is a view similar to FIG. 14 but showing both of the caps after being press fit onto the male and female fittings respectively.

Thereafter, as shown in FIG. 14, one of the cap members (e.g., cap 12) is press fit onto the male threads 41a of fitting 41 (as illustrated); and in FIG. 15, the remaining cap member (i.e., cap 11 is press fit onto female fitting 40. At this point, both of the mating fittings have been capped for protection and have further been associated as a pair by still being connected via the frangible connecting strip 13. Arrows 47 and 48 are included to represent movement of connector fittings 40 and 41 toward each other.

As previously mentioned, in the preferred embodiment, color coding is preferably employed to provide a continuing identification of matched pairs after frangible strip 13 is broken. It should be noted, however, that other types of identification could be employed as, for example, by marking pair with numerals, alphabetical letters or other identifiers.

Figure 16:
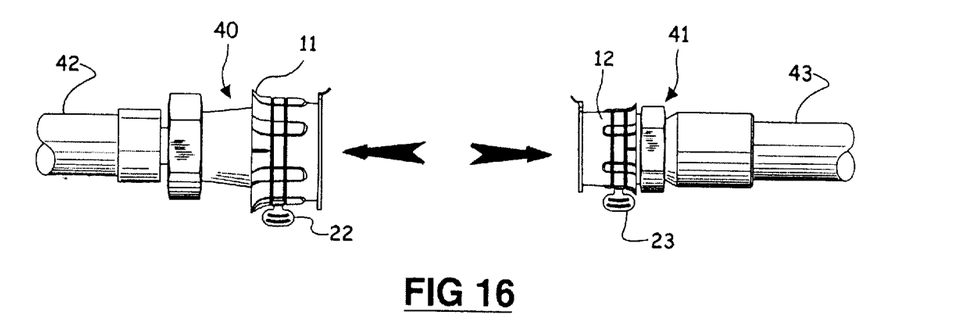
FIG. 16 is a view similar to FIG. 15 but showing the condition of the fittings and caps when the caps are fit onto a comfortably sized fitting (as shown in FIG. 7) and after the caps have been separated by breaking the interconnecting frangible strip.

FIG. 16 is a view similar to FIG. 15 but showing the condition of the fittings and caps when the caps are fit onto a comfortably sized fitting (as shown in FIG. 7) and after the caps have been separated by breaking the interconnecting frangible strip and moving the caps apart as represented by the arrows.

As previously mentioned, one of the advantages of the caps is their versatility in being useable on fittings of significantly different sizes. This is particularly attractive where both US and Metric fittings are involved. Thus, for example, because of the expandable reliefs, caps that can be comfortably fit onto a connector sized in inches can almost always be fit onto a nearest size connector of metric dimensions.

Figure 17:
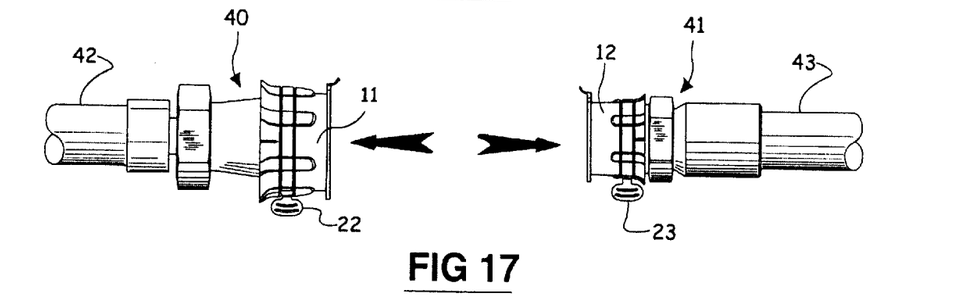
FIG. 17 is a view similar to FIG. 16 but showing the condition of the fittings and caps when the caps are fit onto larger fittings (as shown in FIG. 8) and after the caps have been separated by breaking the interconnecting frangible strip.

FIG. 17 is a view similar to FIG. 16 but showing the condition of the fittings and caps when the caps are fit onto larger fittings (as shown in FIG. 8) and after the caps have been separated by breaking the interconnecting frangible strip. There, the expandable reliefs perform their role of expansion so that the interiors of the caps are enlarged to accommodate the larger fittings. In this connection, the flaring lips 27 and 28 greatly facilitate press fitting of the caps onto the larger fittings.

Figure 18:
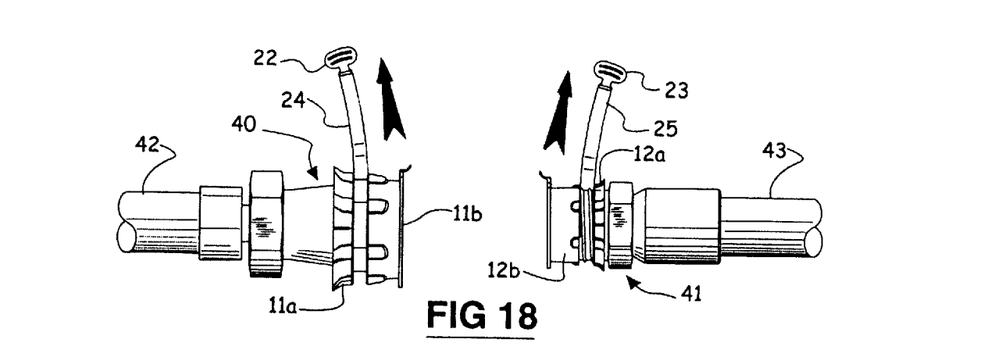
FIG. 18 is a view similar to FIGS. 16 and 17 but showing circumferential frangible strips and grasping tabs after the tabs have been employed to partly break away the circumferential frangible strips.
Figure 19:
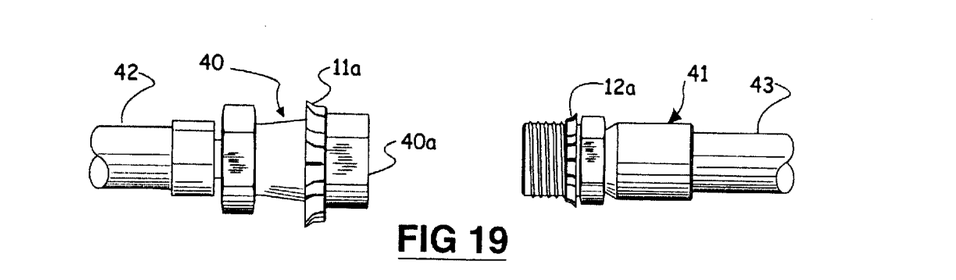
FIG. 19 is a view depicting the fittings of FIG. 18 after the circumferential frangible strips and principal parts of the caps have been removed, leaving color-coded rings.

Now turning to FIG. 18, one of the potential advantages of using the caps is illustrated. There, it will be seen are caps 11 and 12 as they are shown in either FIG. 16 or 17 but with the tabs 22 and 23 being used to break away and remove the circumferential frangible strips 24 and 25, thus separating each of the caps into two parts, i.e., cap 11 into parts 11a, 11b; and cap 12 into parts 12a, 12b. After completely removing the tabs 22, 23 and circumferential frangible strips 24, 25, parts 11b and 12b are removed and may be discarded or retaining for recycling. The remaining annular rings, i.e., parts 11a and 12a which preferably are of the same color (color coded) remain on their respective fittings to identify them as mating pairs for subsequent reconnection. This is depicted in FIG. 19.

Figure 20:
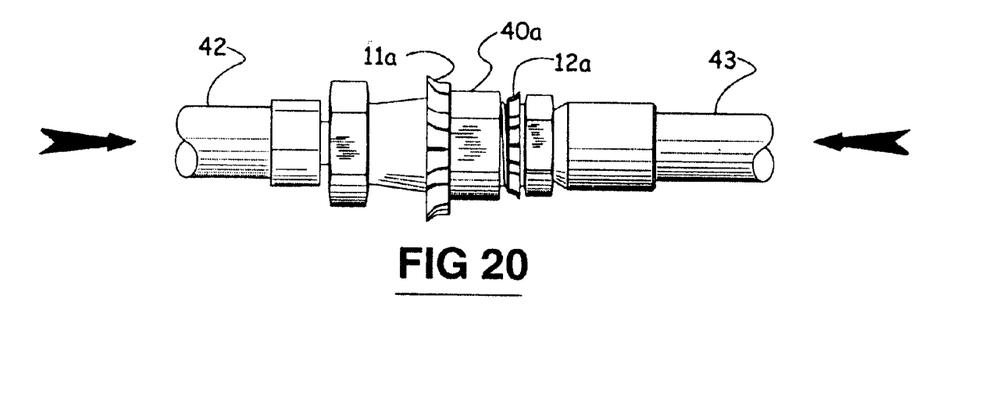
FIG. 20 is a view depicting the fittings of FIG. 19 being connected together.
Figure 21:
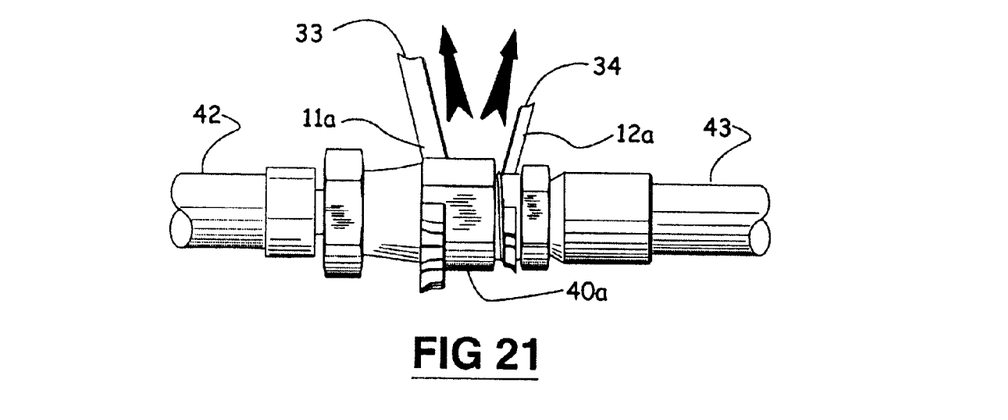
FIG. 21 is a view depicting the fittings of FIG. 20 while being connected and with the color-coded rings being partly removed.
Figure 22:
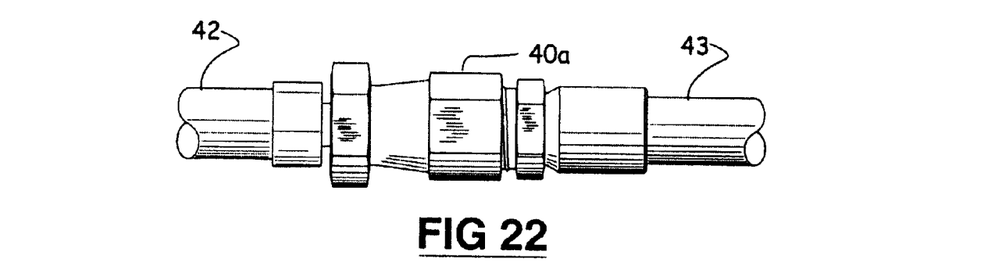
FIG. 22 is a view depicting the fittings of FIG. 21 after the color-coded rings have been completely removed and the fittings snugged up tightly.

Next, if there have been a number of fittings that have been disconnected and capped as per the foregoing description, they would be correctly paired up according to the color coding of the rings such as rings 11a and 12a, after which they would be brought together as shown in FIG. 20. Female fitting 40a is then rotated in the conventional manner to progressively accept the threads 41a (e.g., FIG. 12) until the fittings are tightened to complete the re-connection. Once re-connection is complete, the color coding rings 11a and 12a may either be left in place or stripped away as is depicted in FIG. 21. There, in FIG. 21 are seen the rings 11a and 12a after they have been broken and are being stripped away as represented by the arrows. Once the rings are completely removed, the re-assembled fittings appear as illustrated in FIG. 22.

It will now be evident that there has been described herein improved protective, compensating and identifying caps and cap assemblies, together with their methods of deployment and use.

Although the inventions hereof have been described by way of preferred embodiments, it will be evident that adaptations and modifications may be employed without departing from the spirit and scope thereof For example, many types of coding (in addition to color coding) may be employed to identify matched caps either singly or in pairs.

The terms and expressions employed herein have been used as terms of description and not of limitation; and thus, there is no intent of excluding equivalents, but on the contrary it is intended to cover any and all equivalents that may be employed without departing from the spirit and scope of the invention.

What is claimed is:

1. A compensating and identifying member for protecting fittings comprising a cup-shaped member having a plurality of side segments connected to form a symmetrical enclosure, said member having expandable relief recesses of resilient material contiguously homogeneous with and partly interconnecting at least one pair of said side segments.

2. A member according to claim 1 wherein said cup-shaped member has a first end and a second end at opposite extremities of said member and wherein said member further includes a closure panel closing said first end of said member.

3. A member according to claim 2 wherein said closure panel is homogeneous with said side segments.

4. A member according to claim 2 wherein said side segments are essentially planar.

5. A member according to claim 2 wherein said side segments are arcuate.

6. A member according to claim 4 wherein said symmetrical enclosure is a hexagon.

7. A member according to claim 1 wherein said relief recesses completely connect said at least one pair of said side segments.

8. A member according to claim 3 wherein said second end is open to produce an opening and wherein adjacent said opening, regions of said segments flair outwardly to produce a lip in which a dimension across said lip is greatest at the beginning of said opening and progressively lessens for a predetermined distance inwardly from said opening.

9. A member according to claim 8 wherein said lip includes a line of reduced thickness extending across said lip.

10. A member according to claim 8 wherein portions of said segments from said lip to said first end slope inwardly to produce a slightly tapered geometry characterized in that the cross section of said member decreases correspondingly from said predetermined distance to said first end.

11. A member according to claim 10 wherein said slightly tapered geometry is further characterized in that said inward slope is at an angle lying in a range of from 1 to 15 degrees from the vertical.

12. A member according to claim 8 wherein adjacent said lip said member includes a first circumferential crease and a second circumferential crease substantially parallel to said first circumferential crease and displaced from first circumferential crease to create a frangible strip adapted for manual disengagement from said member.

13. A member according to claim 12 wherein said strip is continuous and extends entirely around said member.

14. A member according to claim 12 wherein said strip includes a flap extending from said strip and adapted for manual engagement and use in breaking said frangible strip away from said member, whereupon, when said frangible strip is broken away from said member, said member is separated into two separate parts.

15. A member according to claim 14 wherein at least one of said two separate parts is color coded.

16. A compensating and identifying cap assembly including:
   a. a first compensating and identifying member for protecting fittings comprising a first generally cylindrically shaped member having a first plurality of substantially planar side segments contiguously connected to form a polygon, said first member having expandable relief recesses of resilient material contiguously homogeneous with and interconnecting at least two pairs of said first plurality of substantially planar side segments;
   b. a second compensating and identifying member for protecting fittings comprising an essentially cylindrically shaped member smaller than said first member, said second member having a plurality of substantially arcuate side panel segments contiguously connected to form said essentially cylindrically shaped member, said second member having expandable relief recesses of resilient material contiguously homogeneous with and interconnecting at least two pairs of said arcuate side panel segments; and
   c. a connecting frangible strip connecting said first member with said second member and contiguous with said first member and said second member.

17. An assembly according to claim 16 wherein said first member has a first end and a second end at opposite extremities of said first member and wherein said first member further includes a first closure panel closing said first end of said first member; and wherein said second member has a first end and a second end at opposite extremities of said second member and wherein said second member further includes a second closure panel closing said first end of said second member.

18. An assembly according to claim 17 wherein said first closure panel is homogeneous with the side panel segments of said first member and wherein said second closure panel is homogeneous with the side panel segments of said second member.

19. An assembly according to claim 16 wherein walls of said first member form a hexagon and wherein walls of said second member form a segmented cylinder.

20. An assembly according to claim 16 wherein the relief recesses in said first member extend entirely along one of the adjacent side panels of said first member; and wherein the the relief recesses in said second member extend entirely along one of the adjacent side panel segments of said second member.

21. An assembly according to claim 18 wherein said second end of said first member is open to produce a first opening and wherein adjacent said first opening, regions of said side panel segments of said first member flair outwardly to produce a first lip in which a dimension across said first lip is greatest at the beginning of said opening and progressively lessens at predetermined rates for predetermined distances inwardly from said first opening, and wherein said second end of said second member is open to produce a second opening and wherein adjacent said second opening, regions of said side panel segments of said second member flair outwardly to produce a second lip in which a dimension across said second lip is greatest at the beginning of said second opening and progressively lessens at predetermined rates for predetermined distances inwardly from said second opening.

22. An assembly according to claim 21 wherein adjacent said first lip said first member includes a first circumferential crease and a second circumferential crease substantially parallel to said first circumferential crease and displaced from said first circumferential crease to create a first frangible strip adapted for manual disengagement from said first member; and wherein adjacent said second lip, said second member includes a third circumferential crease and a fourth circumferential crease substantially parallel to said third circumferential crease and displaced from said third circumferential crease to create a second frangible strip adapted for manual disengagement from said second member.

23. An assembly according to claim 22 wherein said first strip is continuous and extends entirely around said first member, and wherein said second strip is continuous and extends entirely around said second member.

24. An assembly according to claim 22 wherein said first strip includes a flap extending from said first strip and adapted for manual engagement and use in breaking said first frangible strip away from said first member, whereupon, when said first frangible strip is broken away from said first member, said first member is separated into two separate parts; and wherein said second strip includes a flap extending from said second strip and adapted for manual engagement and use in breaking said second frangible strip away from said second member, whereupon, when said second frangible strip is broken away from said second member, said second member is separated into two separate parts.

25. An assembly according to claim 24 wherein at least one of said separate parts of one of said members is color coded.

26. A method of identifying and protecting a pair of mating fittings comprising:
   a. identifying the approximate size of one of said pair of fittings,
   b. selecting the corresponding size for a member constructed according to claim 4,
   c. disposing the selected member of the corresponding size adjacent said one of said fittings, and
   d. expanding recessed reliefs of said selected member by press fitting said selected member onto said one of said fittings.

27. The method according to claim 26 further including selecting said member according to a color code.

28. The method according to claim 26 further including:
   a. identifying the approximate size of the other of said pair of fittings,
   b. selecting the corresponding size for another member constructed according to claim 5,
   c. disposing said another member adjacent said other of said pair of fittings, and
   d. expanding recessed reliefs of said another member by press fitting said another member onto said other of said pair of fittings.

29. A method of identifying and protecting a mated pair of fittings using the compensating and identifying assembly of claim 16 comprising:
   a. identifying the approximate size of a first one of said pair of fittings,
   b. selecting corresponding size for a first shaped member constructed according to claim 16,
   c. disposing said first shaped member adjacent said first one of said fittings,
   d. expanding recessed reliefs of said first shaped member by press fitting said first shaped member onto said one of said fittings;
   e. identifying the approximate size of the other one of said pair of fittings,
   f. selecting corresponding size for said second shaped member constructed according to claim 16,
   g. disposing said second shaped member adjacent said other one of said pair of fittings, and
   h. expanding recessed reliefs of said second shaped member by press fitting said second shaped member onto said other one of said pair of fittings.

30. The method according to claim 29 further including selecting said first and second members according to a color code.

31. The method according to claim 30 further including tearing said connecting frangible strip to separate said first and second members from each other.

32. A method of identifying and protecting a mated pair of fittings using the compensating and identifying assembly of claim 22 comprising:
   a. identifying the approximate size of a first one of said pair of fittings,
   b. selecting corresponding size for said first shaped member constructed according to claim 22,
   c. disposing said first shaped member adjacent said first one of said fittings,
   d. expanding recessed reliefs of said first shaped member by press fitting said first shaped member onto said one of said fittings;
   e. identifying the approximate size of the other one of said pair of fittings,
   f. selecting corresponding size for said second shaped member constructed according to claim 22,
   g. disposing said second shaped member adjacent said other one of said pair of fittings, and
   h. expanding recessed reliefs of said second shaped member by press fitting said second shaped member onto said other one of said pair of fittings.

33. The method according to claim 32 further including selecting said first and second members according to a color code.

34. The method according to claim 33 further including tearing said connecting frangible strip to separate said first and second members from each other.

35. The method according to claim 33 further including tearing said first frangible strip thereby to separate said first member into two separate parts.

36. The method according to claim 34 further including tearing said second frangible strip thereby to separate said second member into two separate parts.

37. The method according to claim 34 further including tearing said first frangible strip and said second frangible strip away from said first member and said second member thereby to separate each of said first member and said second member into separate parts.

* * * * *